(12) United States Patent
Dai et al.

(10) Patent No.: US 10,037,096 B2
(45) Date of Patent: Jul. 31, 2018

(54) DISPLAY PANEL AND DISPLAY APPARATUS HAVING THE SAME

(71) Applicants: BOE TECHNOLOGY GROUP CO., LTD., Beijing (CN); Chengdu BOE Optoelectronics Technology Co., Ltd., Chengdu (CN)

(72) Inventors: Lei Dai, Beijing (CN); Youqiang Lu, Beijing (CN); Youngyik Ko, Beijing (CN); Xiaojing Qi, Beijing (CN); Weiyun Huang, Beijing (CN)

(73) Assignees: BOE TECHNOLOGY GROUP CO., LTD., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 0 days.

(21) Appl. No.: 15/303,483

(22) PCT Filed: Apr. 6, 2016

(86) PCT No.: PCT/CN2016/078559
§ 371 (c)(1),
(2) Date: Oct. 11, 2016

(87) PCT Pub. No.: WO2017/008540
PCT Pub. Date: Jan. 19, 2017

(65) Prior Publication Data
US 2017/0185200 A1   Jun. 29, 2017

(30) Foreign Application Priority Data
Jul. 10, 2015   (CN) .................... 2015 2 0500800 U (51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 2203/04102* (2013.01)

(58) Field of Classification Search
CPC ......... G06F 2203/04102; G06F 3/0412; G06F 3/0416; G06F 3/044
See application file for complete search history.

(56) References Cited

U.S. PATENT DOCUMENTS

2008/0203279 A1* 8/2008 Kobashi ................ G01J 1/1626
250/216
2011/0267284 A1   11/2011 Lee et al.
(Continued)

FOREIGN PATENT DOCUMENTS

CN           104375297 A    2/2015

OTHER PUBLICATIONS

International Search Report & Written Opinion dated Jul. 12, 2016 regarding PCT/CN2016/018559.

*Primary Examiner* — Afroza Chowdhury
(74) *Attorney, Agent, or Firm* — Intellectual Valley Law, P.C.

(57) ABSTRACT

The present application discloses a display panel comprising a display substrate in a display area and a display circuit board electrically connected to the display substrate; a touch button in a touch button area and a touch button circuit board electrically connected to the touch button; and a connecting line for connecting the display circuit board and the touch button circuit board, the connecting line substantially outside of the display area.

19 Claims, 9 Drawing Sheets

(56) References Cited

U.S. PATENT DOCUMENTS

| | | | |
|---|---|---|---|
| 2013/0335376 A1* | 12/2013 | Lee | G06F 3/0416 345/174 |
| 2014/0070875 A1 | 3/2014 | Dunphy et al. | |
| 2014/0340348 A1* | 11/2014 | Park | G06F 3/044 345/174 |

* cited by examiner

FIG. 1

*Related Art*

DISPLAY PANEL AND DISPLAY APPARATUS HAVING THE SAME

CROSS-REFERENCE TO RELATED APPLICATION

This application claims priority to Chinese Patent Application No. 201520500800.X, filed Jul. 10, 2015, the contents of which are incorporated by reference in the entirety.

TECHNICAL FIELD

The present invention relates to display technology, more particularly, to a display panel and a display apparatus having the same.

BACKGROUND

Conventional touch devices can be generally categorized into resistive, capacitive, optical, sound wave, and electromagnetic designs. The capacitive-type touch devices have found a wide range of applications. Typically, a touch control panel includes a display substrate, a touch control substrate, and touch buttons, dividing the panel into a display area and a touch button area.

SUMMARY

In one aspect, the present invention provides a display panel comprising a display substrate in a display area and a display circuit board electrically connected to the display substrate; a touch button in a touch button area and a touch button circuit board electrically connected to the touch button; and a connecting line for connecting the display circuit board and the touch button circuit board, the connecting line substantially outside of the display area.

Optionally, the display panel further comprises a touch layer over the display substrate; and a touch control circuit board electrically connected to the touch layer, wherein the touch control circuit board is electrically connected to the touch button circuit board through the connecting line.

Optionally, the touch layer comprises a sense electrode layer and a drive electrode layer, the connecting line is in a same layer and made of a same material as one of the sense electrode layer and the drive electrode layer.

Optionally, the connecting line is a line circling around a peripheral area, forming a connecting line area having a first side and a second side opposite to each other, and a third side and a fourth side opposite to each other.

Optionally, the display panel further comprises an upper polarizer on a light emitting side of the display substrate.

Optionally, the display panel has an outline forming an outline area, the outline area has a first side and a second side opposite to each other, and a third side and a fourth side opposite to each other; the upper polarizer has a first side and a second side opposite to each other, and a third side and a fourth side opposite to each other, each side corresponding to each side of the outline area.

Optionally, the display panel further comprises a plurality of first bonding pads between the first side of the outline area and the first side of the upper polarizer; wherein the plurality of first bonding pads connect the display circuit board, the touch control circuit board, and the touch button circuit board to the connecting line.

Optionally, the upper polarizer further comprises a fifth side connecting the first side and the fourth side, the plurality of first bonding pads are at a corner between the first side and the fourth side of the outline area.

Optionally, the upper polarizer further comprises a fifth side connecting the first side and the fourth side, the plurality of first bonding pads are about a corner between the first side and the fourth side of the outline area.

Optionally, an angle between the first side and the fifth side of the upper polarizer is in the range of about 30° to about 60°.

Optionally, the plurality of first bonding pads are side-by-side.

Optionally, the plurality of first bonding pads comprises a first group of side-by-side first bonding pads along a first direction and a second group of side-by-side first bonding pads along a second direction perpendicular to the first direction.

Optionally, the plurality of first bonding pads comprises an array of first bonding pads.

Optionally, a distance between any of the plurality of the first bonding pads and the first side of the upper polarizer and an extended line thereof is ≥0.3 mm.

Optionally, a distance between any of the plurality of the first bonding pads and the fourth side of the upper polarizer and an extended line thereof is ≥0.3 mm.

Optionally, the display panel further comprises a plurality of second bonding pads between the second side of the outline area and the second side of the upper polarizer; wherein the plurality of second bonding pads connect the connecting line to a driving chip.

Optionally, the connecting line is completely outside of the display area.

In another aspect, the present invention provides a display apparatus comprising a display panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1:
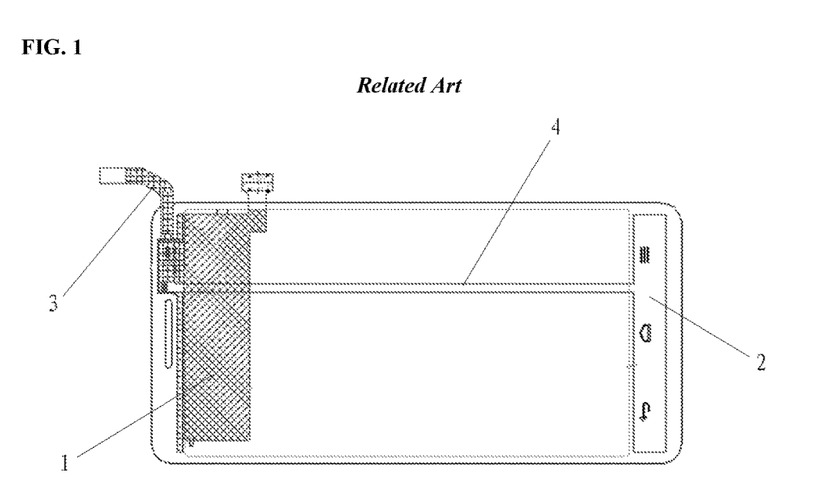
FIG. 1 is a plan view of a conventional touch control panel.

FIG. 1 is a plan view of a conventional touch control panel. Referring to FIG. 1, the touch control panel includes a flexible display circuit board 1, a flexible touch button circuit board 2, and a flexible touch control circuit board 3. The flexible touch button circuit board 2 is on a side of the touch control panel opposite to the flexible display circuit board 1 and the flexible touch control circuit board 3 in plan view of the panel. The flexible touch button circuit board 2 is disposed underneath the touch buttons, and is electrically connected to the touch buttons through a bonding pad. All three circuit boards are then electrically connected to a driving chip through the bonding pad. Accordingly, the flexible display circuit board 1 and the flexible touch control circuit board 3 are electrically connected to the bonding pad through a connecting line 4. Because the flexible display circuit board 1 and the flexible touch control circuit board 3 are disposed on a side opposite to the flexible touch button circuit board 2 in the conventional touch control panel, the connecting line 4 extends through the display area. This design leads to crosstalk between the connecting line 4 and other signal lines of the display substrate and the touch control substrate, resulting in poor display quality.

The present disclosure provides a superior display panel that overcomes the disadvantages and shortcoming of the conventional touch control display panels. In some embodiments, the display panel includes a display substrate in a display area and a display circuit board electrically connected to the display substrate; a touch button in a touch button area and a touch button circuit board electrically connected to the touch button; and a connecting line for connecting the display circuit board and the touch button circuit board, the connecting line substantially outside the display area, e.g., entirely outside the display area. Optionally, the connecting line is substantially within the peripheral area, e.g., entirely within the peripheral area. Optionally, the connecting line does not intersect with any signal lines in the display area, thus the crosstalk between the connecting line and other signal lines in the display area is eliminated or only negligible. Optionally, the connecting line is substantially outside (e.g., entirely outside) the area corresponding to an upper polarizer of the display panel.

As defined herein, the term "display area" refers to a region on the display panel on which an image is displayed. Optionally, a display area is an area across which pixels, each being a unit of display, are arranged in a matrix pattern. For example, a display area is a region surrounded by a line connecting outermost pixels (pixels are basic units for displaying an image) to each other in plan view of the display panel. A touch button area is an area where the touch buttons are located in a display panel. The touch button area is outside the display area. Optionally, the touch button area is adjacent to the display area. A peripheral area is an area in the display substrate or the display panel other than the display area and the touch button area.

Figure 2A:
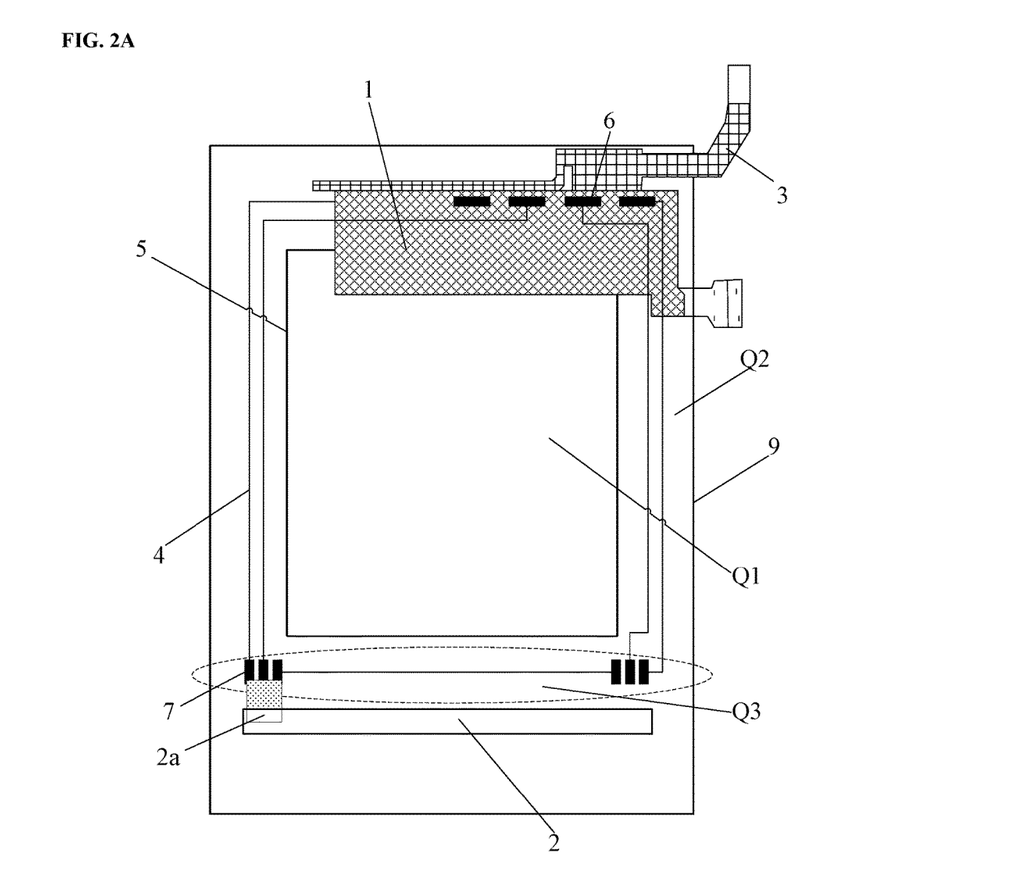
FIGS. 2A-2E are diagrams illustrating the structure of a display panel in some embodiments.

FIGS. 2A-2E are diagrams illustrating the structure of a display panel in some embodiments. Referring to FIG. 2A, the display panel in the embodiment includes a display area Q1, a touch button area Q3, and a peripheral area Q2 surrounding the display area Q1 and the touch button area Q3. The display panel includes a display substrate within the display area Q1, the display substrate electrically connected to a flexible display circuit board 1. The display panel also includes a touch button (e.g., a plurality of touch buttons) within the touch button area Q3, the touch button electrically connected to a flexible touch button circuit board 2. The display panel further includes a connecting line 4 within the peripheral area Q2, connecting the flexible display circuit board 1 and the flexible touch button circuit board 2. As shown in FIG. 2A, the display panel further includes a driving chip 2a. The connecting line 4 is connected to the flexible touch button circuit board 2 through the driving chip 2a.

By having the connecting line 4 disposed within the peripheral area Q2, the crosstalk between the connecting line 4 and other signal lines of the display substrate and the touch control substrate can be eliminated or much reduced. For example, by having this design, the crosstalk between the connecting line 4 and a gate line or a data line in the display area can be avoided. The elimination of crosstalk improves the display quality of the display panel.

In some embodiments, the display panel is a touch control display panel that further includes a touch control substrate. The touch control substrate may be one of an on-cell touch control substrate, an in-cell touch control substrate and a hover touch control substrate. Optionally, the touch control substrate is an on-cell touch control substrate. Optionally, the touch control substrate is on a light emitting side of the display substrate, e.g., on a side of the display substrate distal to the base substrate. The touch control substrate is electrically connected to a flexible touch control circuit board 3. The flexible touch control circuit board 3 is electrically connected to a flexible display circuit board 1 through the connecting line 4.

In some embodiments, the display panel further includes an upper polarizer on a light emitting side of the display substrate. Optionally, the upper polarizer is on a side of the touch substrate distal to the display substrate, e.g., the upper polarizer is on a light emitting side of the touch control substrate.

By having the connecting line 4 connecting the flexible touch control circuit board with the flexible display circuit board, the crosstalk between the connecting line 4 and other signal lines of the display substrate and the touch control substrate can be eliminated or much reduced. For example, by having this design, the crosstalk between the connecting line 4 and a gate line or a data line in the display area can be avoided. The elimination of crosstalk improves the display quality of the display panel.

Figure 2B:
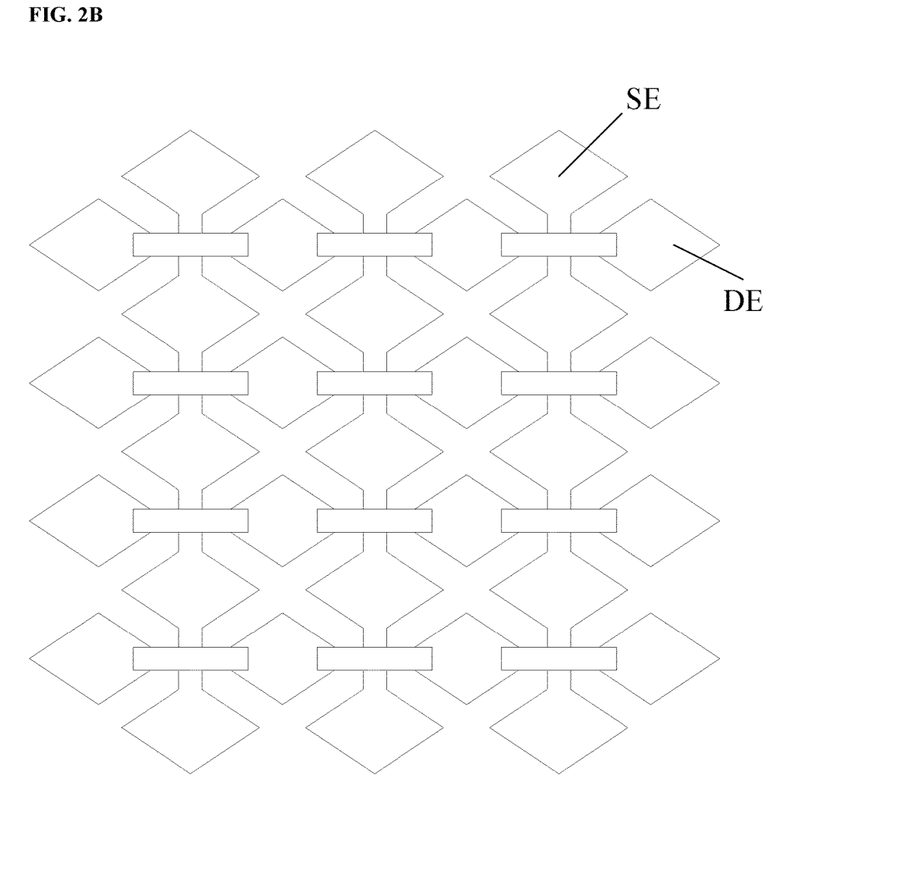

In some embodiments, and referring to FIG. 4B, the touch control display panel is a mutual capacitive touch control display panel that includes a sense electrode layer SE and a drive electrode layer DE. Optionally, the sense electrode layer SE and the drive electrode layer DE are in a same layer. Optionally, the sense electrode layer SE and the drive electrode layer DE are in different layers. Optionally, the sense electrode layer SE includes a plurality of first lines along a first direction, each line comprises a plurality of sense electrodes. Optionally, the drive electrode layer DE includes a plurality of second lines along a second direction, each line comprises a plurality of drive electrodes. Optionally, the plurality of first lines and the plurality of second lines intersect each other. Optionally, the connecting line 4 is in a same layer and made of a same material as one of the sense electrode layer SE and the drive electrode layer DE. By having this design, the fabricating process can be simplified, and manufacturing costs lowered. Optionally, the connecting line 4, the sense electrode layer SE, and the drive electrode layer DE are made of a transparent conductive material, e.g., indium tin oxide.

Figure 2C:
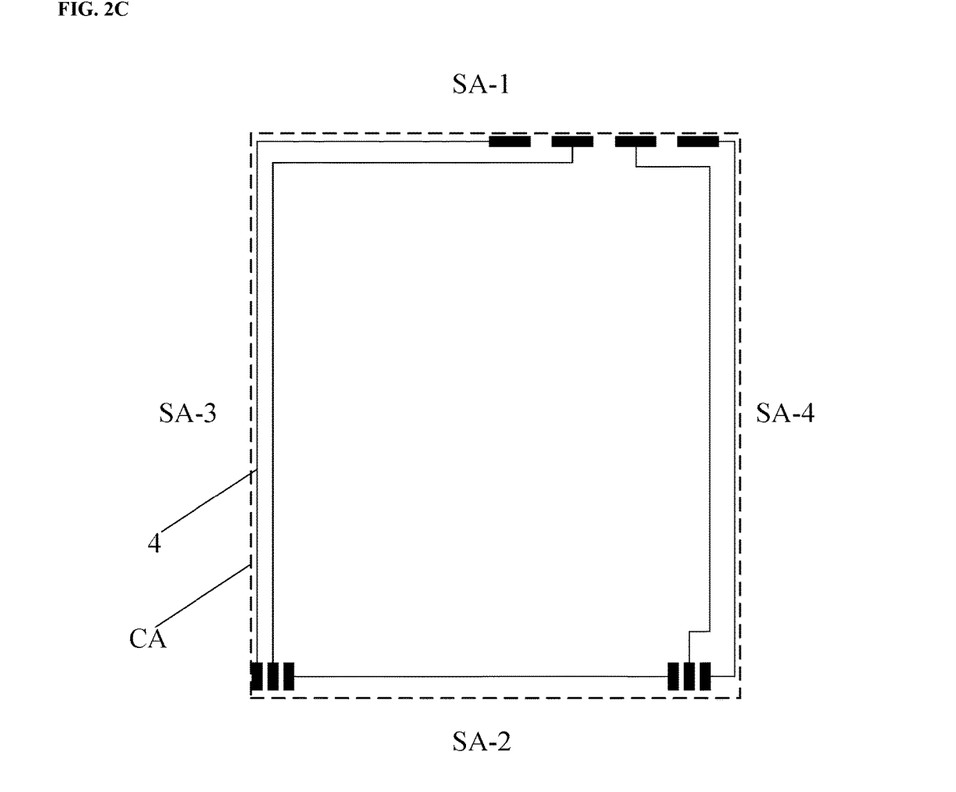

In some embodiments, and referring to FIG. 2C, the connecting line 4 is a line circling around the peripheral area forming a connecting line area CA, a boundary of which has a first side SA-1 and a second side SA-2 opposite to each other, and a third side SA-3 and a fourth side SA-4 opposite to each other. Optionally, the connecting line area CA is a rectangle or a square. Optionally, the connecting line area CA is a circle or an ellipse.

Figure 2D:
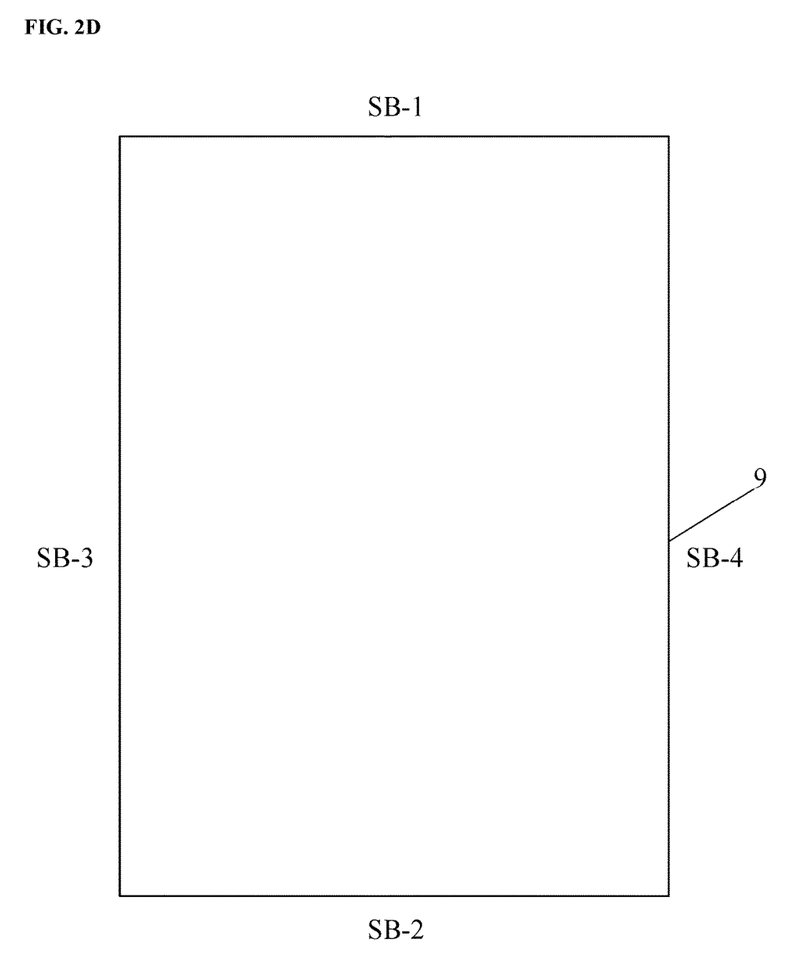

In some embodiments, and referring to FIG. 2D, the display panel has an outline forming an outline area 9. Optionally, the outline area 9 is the sum of the display area Q1, the peripheral area Q2, and the touch button area Q3. The boundary of the outline area 9 has a first side SB-1 and a second side SB-2 opposite to each other, and a third side SB-3 and a fourth side SB-4 opposite to each other. Optionally, the outline area 9 is a rectangle or a square. Optionally, the outline area 9 is a circle or an ellipse.

Figure 2E:
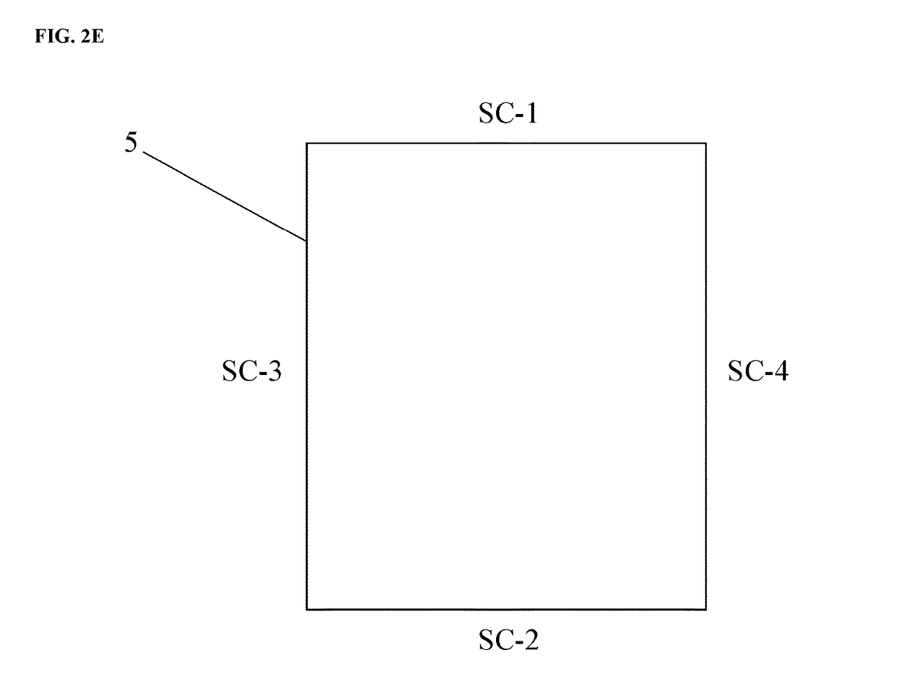

In some embodiments, and referring to FIG. 2E, the boundary of the upper polarizer 5 has a first side SC-1 and a second side SC-2 opposite to each other, and a third side SC-3 and a fourth side SC-4 opposite to each other, each side corresponding to each side of the connecting line area CA. Optionally, the upper polarizer 5 has an area smaller than that of the connecting line area CA, and is within the connecting line area CA. Optionally, the display area Q1 has an area smaller than that of the upper polarizer 5, and is within the upper polarizer area.

In some embodiments, the touch button area Q3 has a first side and a second side opposite to each other, and a third side and a fourth side opposite to each other. Optionally, the first side of the touch button area Q3 is proximal to the second side of the connecting line area or the second side of the upper polarizer 5, and the second side of the touch button area Q3 is distal to the second side of the connecting line area or the second side of the upper polarizer 5.

In some embodiments, the display panel further includes a plurality of first bonding pads 6 between a side (e.g., the first side) of the outline area 9 and a side (e.g., the first side) of the upper polarizer 5. Optionally, the plurality of first bonding pads 6 connect the flexible display circuit board, the flexible touch control circuit board, and the flexible touch button circuit board to the connecting line 4.

In some embodiments, the upper polarizer 5 includes four corners, each of which is formed between two sides. For example, the first side and the fourth side form a first corner between the first side and the fourth side of the polarizer 5. Optionally, a portion of any one or more of the four corners is cut out. For example, a portion of a first corner formed between the first side and the fourth side is cut out. Optionally, the upper polarizer 5 further includes a fifth side connecting the first side and the fourth side of the upper polarizer 5, i.e., a portion of a corner formed between the first side and the fourth side is cut out.

In some embodiments, the plurality of first bonding pads 6 are at a corner between two sides of the outline area 9. In some embodiments, the plurality of first bonding pads 6 are about a corner between two sides of the outline area 9. Optionally, the plurality of first bonding pads 6 are proximal to a corner between two sides of the upper polarizer 5. Optionally, the plurality of first bonding pads 6 are at a corner between two sides of the outline area 9, and proximal to a corner between two sides of the upper polarizer 5. Optionally, the plurality of first bonding pads 6 are about a corner between two sides of the outline area 9, and proximal to a corner between two sides of the upper polarizer 5. Optionally, the plurality of first bonding pads 6 are at a corner between two sides of the outline area 9, and proximal to a cut-out corner between two sides of the upper polarizer 5. Optionally, the plurality of first bonding pads 6 are about a corner between two sides of the outline area 9, and proximal to a cut-out corner between two sides of the upper polarizer 5. For instance, the plurality of first bonding pads 6 may be at a first corner between the first side and the fourth side of the outline area 9. Alternatively, the plurality of first bonding pads 6 are about a first corner between the first side and the fourth side of the outline area 9. Optionally, the plurality of first bonding pads 6 are proximal to the fifth side, the first side, and the fourth side of the upper polarizer 5.

By having a cut-out portion at the corner where the bonding pads (e.g., the first bonding pads) are disposed, more space becomes available for having the bonding pads at the corner. Consequently, during the process of bonding the flexible display circuit board, the flexible touch control circuit board, and the flexible touch button circuit board to the connecting line 4, any inadvertent damages (e.g., burn damage) to the upper polarizer 5 can be avoided.

Optionally, an angle between the first side and the fifth side of the upper polarizer 5 is in the range of about 30° to about 60°. Optionally, an angle between the fourth side and the fifth side of the upper polarizer 5 is in the range of about 30° to about 60°. The area of the cut-out portion may be determined by, e.g., the numbers of dimensions of the plurality of bonding pads, and/or the space desired for having the bonding pads.

In some embodiments, the shortest distance between one side of the outline area 9 and a corresponding side of the display substrate is about 1.5 mm. Optionally, the shortest distance between one side of the display substrate and a corresponding side of the upper polarizer 5 is about 0.4 mm. Optionally, the shortest distance between one side of the outline area 9 and a corresponding side of the upper polarizer 5 is about 1.1 mm. The plurality of bonding pads (e.g., the first bonding pads) are disposed between one side of the outline area 9 and a corresponding side of the upper polarizer 5, for bonding the flexible display circuit board, the flexible touch control circuit board, and the flexible touch button circuit board to the connecting line 4.

In some embodiments, the shortest distance between the periphery of the outline area 9 and the periphery of the display substrate is about 1.5 mm. Optionally, the shortest distance between the periphery of the display substrate and the periphery of the upper polarizer 5 is about 0.4 mm. Optionally, the shortest distance between the periphery of the outline area 9 and the periphery of the upper polarizer 5 is about 1.1 mm. The plurality of bonding pads (e.g., the first bonding pads) are disposed between the periphery of the outline area 9 and the periphery of the upper polarizer 5, for bonding the flexible display circuit board, the flexible touch control circuit board, and the flexible touch button circuit board to the connecting 4.

In some embodiments, the distance between each bonding pad and a proximal side of the upper polarizer 5 and an extended line thereof is ≥0.3 mm. Optionally, the distance between each bonding pad and the first side of the upper polarizer 5 and an extended line thereof is ≥0.3 mm. Optionally, the distance between each bonding pad and the fourth side of the upper polarizer 5 and an extended line thereof is ≥0.3 mm. By having this design, any inadvertent damages (e.g., burn damage) to the upper polarizer 5 can be avoided, at the same time maintaining the peripheral region of the display panel narrow.

In some embodiments, the display panel further includes a plurality of second bonding pads 7 between a side (e.g., the second side) of the outline area 9 and a corresponding side (e.g., the second side) of the upper polarizer 5. Optionally, the plurality of second bonding pads 7 connect the connecting line 4 to a driving chip 2a. Optionally, the plurality of first bonding pads 6 and the plurality of second bonding pads 7 connect the flexible display circuit board, the flexible touch control circuit board, and the flexible touch button circuit board to the connecting line 4.

FIGS. 3-6 are diagrams illustrating the structure of several display panels in some embodiments. Referring to FIGS. 3-6, a corner of the upper polarizer 5 in the embodiment is cut out to provide space for the plurality of side-by-side first bonding pads 6. In FIGS. 3-6, the corner of the upper polarizer 5 between the first side SC-1 and the fourth side SC-4 is cut out, resulting in a fifth side SC-5 connecting the first side SC-1 and the fourth side SC-4 of the upper polarizer 5. Optionally, the angle between the first side SC-1 and the fifth side SC-5 of the upper polarizer 5 is in the range of about 30° to about 60°. Optionally, the angle between the fourth side SC-4 and the fifth side SC-5 of the upper polarizer 5 is in the range of about 30° to about 60°. In FIGS. 3-6, the shortest distance between the first side SB-1 of the outline area 9 and the first side SC-1 of the upper polarizer 5 is about 1.1 mm.

Figure 3:
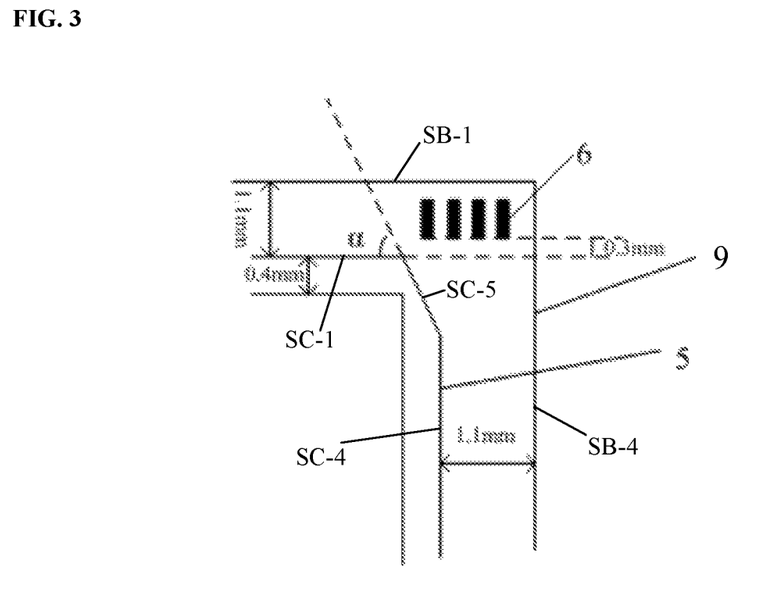
FIG. 3 is a diagram illustrating the structure of a portion of a display panel in some embodiments.

Referring to FIG. 3, the plurality of first bonding pads 6 are a plurality of side-by-side first bonding pads 6. The plurality of side-by-side first bonding pads 6 extend along a direction substantially parallel to the first side SC-1 of the upper polarizer 5. The length direction of each first bonding pad 5 is substantially parallel to the fourth side SC-4 of the upper polarizer 5. In FIG. 3, each first bonding pad has a length of about 0.7 mm and a width about 0.1 mm. The plurality of bonding pads 6 may be spaced part from each other by an appropriate pitch. Optionally, the plurality of bonding pads 6 are spaced apart from each other by a pitch of about 0.2 mm. Optionally, the plurality of bonding pads 6 are spaced apart from each other so that they span along a direction parallel to the first side SC-1 of the upper polarizer 5 by a distance in the range of about 1.5 mm to about 2.0 mm. In FIG. 3, the distance between each bonding pad 6 and the first side SC-1 of the upper polarizer 5 and an extended line thereof is ≥0.3 mm to avoid inadvertent damages (e.g., burn damage) to the upper polarizer 5.

Figure 4:
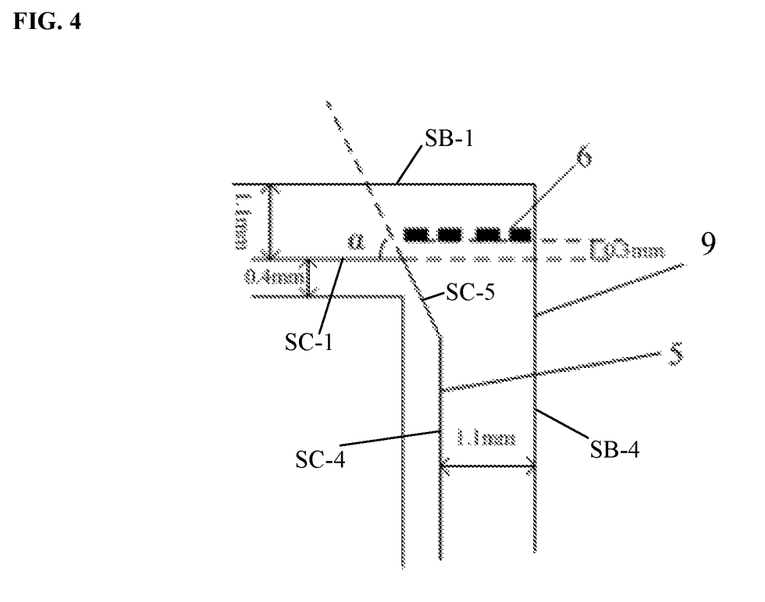
FIG. 4 is a diagram illustrating the structure of a portion of a display panel in some embodiments.

Referring to FIG. 4, the plurality of first bonding pads 6 are a plurality of side-by-side first bonding pads 6. The plurality of side-by-side first bonding pads 6 extend along a direction substantially parallel to the first side SC-1 of the upper polarizer 5. The length direction of each first bonding pad 5 is also substantially parallel to the first side SC-1 of the upper polarizer 5. In FIG. 4, each first bonding pad has a length of about 0.3 mm and a width about 0.2 mm. The plurality of bonding pads 6 may be spaced part from each other by an appropriate pitch. Optionally, the plurality of bonding pads 6 are spaced apart from each other by a pitch of about 0.1 mm. Optionally, the plurality of bonding pads 6 are spaced apart from each other so that they span along a direction parallel to the first side SC-1 of the upper polarizer 5 by a distance in the range of about 1.5 mm to about 2.0 mm. In FIG. 4, the distance between each bonding pad 6 and the first side SC-1 of the upper polarizer 5 and an extended line thereof is ≥0.3 mm to avoid inadvertent damages (e.g., burn damage) to the upper polarizer 5.

Figure 5:
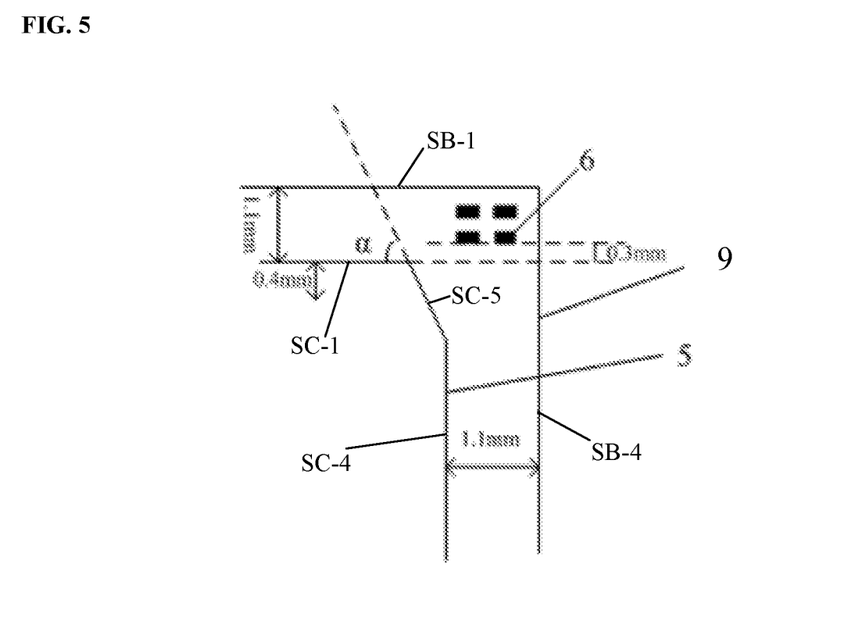
FIG. 5 is a diagram illustrating the structure of a or of a display panel in some embodiments.

Referring to FIG. 5, the plurality of first bonding pads 6 are an array of first bonding pads 6. The array of first bonding pads 6 extend along a first direction substantially parallel to the first side SC-1 of the upper polarizer 5, and along a second direction substantially parallel to the fourth side SC-4 of the upper polarizer 5. Optionally, the length direction of each first bonding pad 5 is substantially parallel to the first side SC-1 of the upper polarizer 5, each first bonding pad has a length of about 0.3 mm and a width about 0.2 mm. Optionally, the length direction of each first bonding pad 5 is substantially parallel to the fourth side SC-4 of the upper polarizer 5, each first bonding pad has a length of about 0.3 mm and a width about 0.2 mm. The plurality of bonding pads 6 may be spaced part from each other by an appropriate pitch. Optionally, the plurality of bonding pads 6 are spaced apart from each other so that they span along a direction parallel to the first side SC-1 of the upper polarizer 5 by a distance in the range of about 1.5 mm to about 2.0 mm. In FIG. 5, the distance between each bonding pad 6 and the first side SC-1 of the upper polarizer 5 and an extended line thereof is ≥0.3 mm to avoid inadvertent damages (e.g., burn damage) to the upper polarizer 5.

Figure 6:
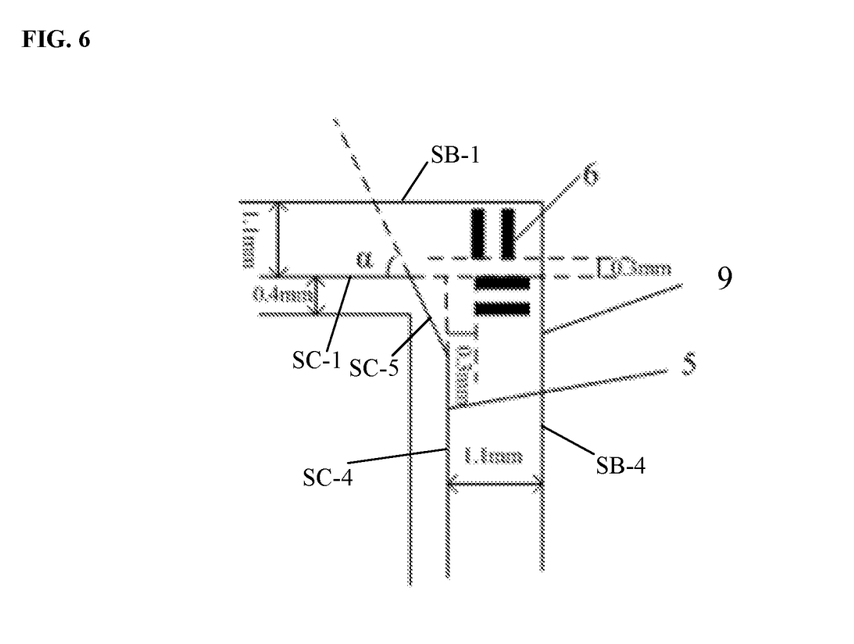
FIG. 6 is a diagram illustrating the structure of a portion of a display panel in some embodiments.

FIG. 6 is a diagram illustrating the structure of a portion of a display panel in some embodiments. Referring to FIG. 6, the plurality of first bonding pads includes a first group of side-by-side first bonding pads 6 along a first direction and a second group of side-by-side first bonding pads 6 along a second direction perpendicular to the first direction. The first direction is a direction substantially parallel to the first side SC-1 of the upper polarizer 5. The length direction of each first bonding pad 5 in the first group is substantially parallel to the fourth side SC-4 of the upper polarizer 5, each first bonding pad in the first group has a length of about 0.7 mm and a width about 0.1 mm. The length direction of each first bonding pad 5 in the second group is substantially parallel to the first side SC-1 of the upper polarizer 5, each first bonding pad in the first group has a length of about 0.7 mm and a width about 0.1 mm. Optionally, the distance between each bonding pad 6 in the first group and the first side SC-1 of the upper polarizer 5 and an extended line thereof is ≥0.3 mm. Optionally, the distance between each bonding pad 6 in the second group and the fourth side SC-4 of the upper polarizer 5 and an extended line thereof is ≥0.3 mm. The plurality of bonding pads 6 may be spaced part from each other by an appropriate pitch. Optionally, the plurality of bonding pads 6 in the first group are spaced apart from each other so that they span along a direction parallel to the first side SC-1 of the upper polarizer 5 by a distance in the range of about 1.5 mm to about 2.0 mm. Optionally, the plurality of bonding pads 6 in the second group are spaced apart from each other so that they span along a direction parallel to the fourth side SC-4 of the upper polarizer 5 by a distance in the range of about 1.5 mm to about 2.0 mm.

Figure 7:
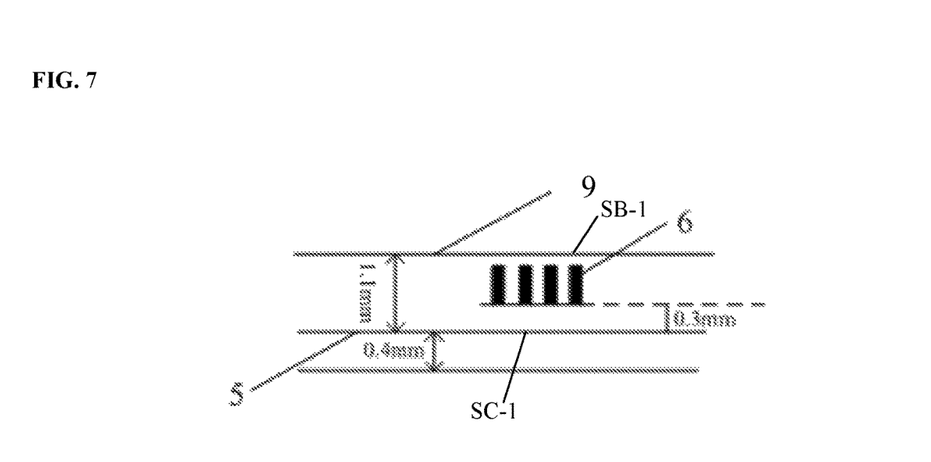
FIG. 7 is a diagram illustrating the structure of a portion of a display panel in some embodiments.
Figure 8:
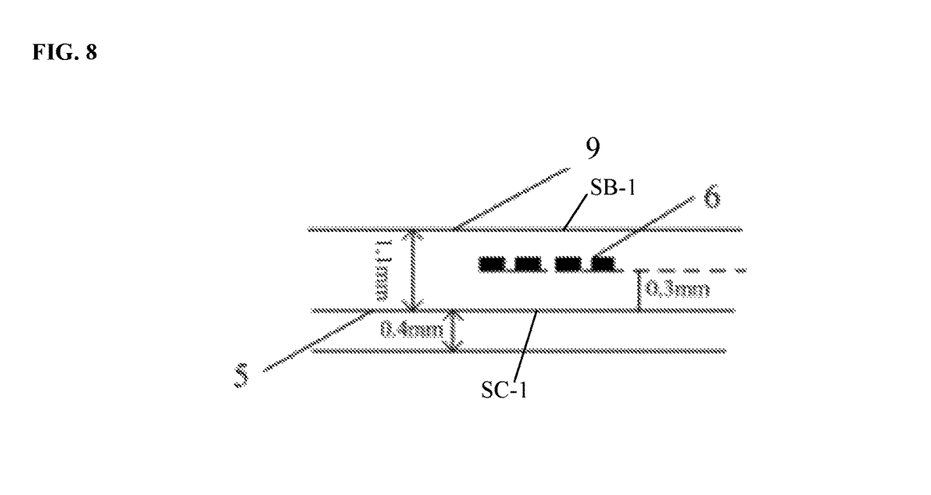
FIG. 8 is a diagram illustrating the structure of a portion of a display panel in some embodiments.

FIGS. 7-8 are diagrams illustrating the structure of two display panels in some embodiments. Referring to FIGS. 7-8, a corner of the upper polarizer 5 in the embodiment is not cut out. A plurality of side-by-side first bonding pads 6 is disposed between a side (e.g., the first side SC-1) of the upper polarizer 5 and a side (e.g., the first side SB-1) of the outline area 9. In FIGS. 7-8, the shortest distance between the first side SB-1 of the outline area 9 and the first side SC-1 of the upper polarizer 5 is about 1.1 mm.

Referring to FIG. 7, the plurality of first bonding pads 6 are a plurality of side-by-side first bonding pads 6. The plurality of side-by-side first bonding pads 6 extend along a direction substantially parallel to the first side SC-1 of the upper polarizer 5. The length direction of each first bonding pad 5 is substantially parallel to the fourth side SC-4 of the upper polarizer 5. In FIG. 7, each first bonding pad has a length of about 0.7 mm and a width about 0.1 mm. The plurality of bonding pads 6 may be spaced part from each other by an appropriate pitch. Optionally, the plurality of bonding pads 6 are spaced apart from each other by a pitch of about 0.2 mm. Optionally, the plurality of bonding pads 6 are spaced apart from each other so that they span along a direction parallel to the first side SC-1 of the upper polarizer 5 by a distance in the range of about 1.5 mm to about 2.0 mm. In FIG. 7, the distance between each bonding pad 6 and the first side SC-1 of the upper polarizer 5 and an extended line thereof is ≥0.3 mm to avoid inadvertent damages (e.g., burn damage) to the upper polarizer 5.

Referring to FIG. 8, the plurality of first bonding pads 6 are a plurality of side-by-side first bonding pads 6. The plurality of side-by-side first bonding pads 6 extend along a direction substantially parallel to the first side SC-1 of the upper polarizer 5. The length direction of each first bonding pad 5 is also substantially parallel to the first side SC-1 of the upper polarizer 5. In FIG. 8, each first bonding pad has a length of about 0.3 mm and a width about 0.2 mm. The plurality of bonding pads 6 may be spaced part from each other by an appropriate pitch. Optionally, the plurality of bonding pads 6 are spaced apart from each other by a pitch of about 0.1 mm. Optionally, the plurality of bonding pads 6 are spaced apart from each other so that they span along a direction parallel to the first side SC-1 of the upper polarizer 5 by a distance in the range of about 1.5 mm to about 2.0 mm. Optionally, the distance between each bonding pad 6 and the first side SC-1 of the upper polarizer 5 and an extended line thereof is ≥0.3 mm to avoid inadvertent damages (e.g., burn damage) to the upper polarizer 5.

In another aspect, the present disclosure provides a display apparatus having a display substrate described herein. Examples of appropriate display apparatuses include, but are not limited to, a liquid crystal display panel, an electronic paper, an organic light emitting display panel, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A display panel, comprising:
  a display substrate in a display area and a display circuit board electrically connected to the display substrate;
  a touch button in a touch button area and a touch button circuit board electrically connected to the touch button;
  a connecting line circling around a peripheral area to connect the display circuit board and the touch button circuit board, the connecting line connected to the touch button circuit board through a driving chip;
  a touch layer over the display substrate; and
  a touch control circuit board electrically connected to the touch layer, wherein the touch control circuit board is electrically connected to the touch button circuit board through the connecting line;
  wherein the connecting line is substantially outside of the display area, forming a connecting line area; and
  wherein the touch layer comprises a sense electrode layer and a drive electrode layer, the connecting line is in a same layer and comprises a same material as one of the sense electrode layer and the drive electrode layer.

2. The display panel of claim 1, wherein the connecting line is in a same layer and comprises a same material as the sense electrode layer.

3. The display panel of claim 1, wherein the connecting line is in a same layer and comprises a same material as the drive electrode layer.

4. The display panel of claim 1, wherein a boundary of the connecting line area has a first side, a fourth side, a second side, and a third side, in a clock-wise direction;
  the first side of the boundary of the connecting line area and the second side of the boundary of the connecting line area are substantially opposite to each other; and
  the third side of the boundary of the connecting line area and the fourth side of the boundary of the connecting line area are substantially opposite to each other.

5. The display panel of claim 1, comprising:
  an upper polarizer on a light emitting side of the display substrate;
  wherein the display panel has an outline forming an outline area, the outline has a first side, a fourth side, a second side, and a third side, in a clock-wise direction;
  the first side of the outline and the second side of the outline are substantially opposite to each other;
  the third side of the outline and the fourth side of the outline are substantially opposite to each other;
  a boundary of the upper polarizer has a first side, a fourth side, a second side, and a third side, in a clock-wise direction;
  the first side of the boundary of the upper polarizer and the second side of the boundary of the upper polarizer opposite to each other, and the third side of the boundary of the upper polarizer and the fourth side of the boundary of the upper polarizer opposite to each other, each side of the boundary of the upper polarizer corresponding to each side of the outline; and
  the display panel further comprises a plurality of first bonding pads between the first side of the outline and the first side of the boundary of the upper polarizer;
  wherein the plurality of first bonding pads connect the display circuit board, the touch control circuit board, and the touch button circuit board to the connecting line.

6. The display panel of claim 5, wherein the boundary of the upper polarizer further comprises a fifth side connecting the first side of the boundary of the upper polarizer and the fourth side of the boundary of the upper polarizer, the plurality of first bonding pads are at or about a corner between the first side and the fourth side of the outline.

7. The display panel of claim 6, wherein an angle between the first side and the fifth side of the boundary of the upper polarizer is in a range of approximately 30° to approximately 60°.

8. The display panel of claim 5, further comprising a plurality of second bonding pads between the second side of the outline and the second side of the boundary of the upper polarizer; wherein the plurality of second bonding pads connect the connecting line to the driving chip.

9. The display panel of claim 5, wherein the display circuit board and the touch button circuit board are on two substantially opposite sides of the display area.

10. The display panel of claim 9, further comprising:
a touch layer over the display substrate; and
a touch control circuit board electrically connected to the touch layer, wherein the touch control circuit board is electrically connected to the touch button circuit board through the connecting line;
wherein the touch button circuit board is on a side of the display area substantially opposite to the display circuit board and the touch control circuit board.

11. The display panel of claim 10, further comprising an upper polarizer on a light emitting side of the display substrate;
wherein the display panel has an outline forming an outline area, the outline has a first side, a fourth side, a second side, and a third side, in a clock-wise direction;
a boundary of the connecting line area has a first side, a fourth side, a second side, and a third side, in a clock-wise direction;
a boundary of the upper polarizer has a first side, a fourth side, a second side, and a third side, in a clock-wise direction;
the first side of the boundary of the connecting line area and the second side of the boundary of the connecting line area are substantially opposite to each other;
the third side of the boundary of the connecting line area and the fourth side of the boundary of the connecting line area are substantially opposite to each other;
the first side of the outline and the second side of the outline are substantially opposite to each other;
the third side of the outline and the fourth side of the outline are substantially opposite to each other;
the first side of the boundary of the upper polarizer and the second side of the boundary of the upper polarizer opposite to each other, and the third side of the boundary of the upper polarizer and the fourth side of the boundary of the upper polarizer opposite to each other, each side of the boundary of the upper polarizer corresponding to each side of the outline; and
the display panel further comprises a plurality of first bonding pads between the first side of the outline and the first side of the boundary of the upper polarizer; wherein the plurality of first bonding pads connect the display circuit board, the touch control circuit board, and the touch button circuit board to the connecting line.

12. The display panel of claim 11, wherein
the boundary of the upper polarizer further comprises a fifth side connecting the first side of the boundary of the upper polarizer and the fourth side of the boundary of the upper polarizer, the plurality of first bonding pads are at or about a corner between the first side and the fourth side of the outline.

13. The display panel of claim 11, further comprising a plurality of second bonding pads between the second side of the outline and the second side of the boundary of the upper polarizer; wherein the plurality of second bonding pads connect the connecting line to the driving chip.

14. The display panel of claim 5, wherein the plurality of first bonding pads comprises a first group of side-by-side first bonding pads along a first direction and a second group of side-by-side first bonding pads along a second direction perpendicular to the first direction.

15. The display panel of claim 5, wherein the plurality of first bonding pads comprises an array of first bonding pads.

16. The display panel of claim 5, wherein a distance between any of the plurality of the first bonding pads and the first side of the boundary of the upper polarizer and an extended line thereof is ≥0.3 mm.

17. The display panel of claim 5, wherein a distance between any of the plurality of the first bonding pads and the fourth side of the boundary of the upper polarizer and an extended line thereof is ≥0.3 mm.

18. The display panel of claim 1, wherein the connecting line is completely outside of the display area.

19. A display apparatus, comprising the display panel of claim 1.

* * * * *